United States Patent
Gillet et al.

(10) Patent No.: US 12,516,265 B2
(45) Date of Patent: Jan. 6, 2026

(54) PROCESS FOR EXTRACTING SCENTS FROM PLANT MATERIAL IN SOLID FORM

(71) Applicant: GENIALIS, Henrichemont (FR)

(72) Inventors: Guillaume Gillet, Salbris (FR); Isabelle Desjardins-Lavisse, Henrichemont (FR)

(73) Assignee: GENIALIS, Henrichemont (FR)

( * ) Notice: Subject to any disclaimer, the term of this patent is extended or adjusted under 35 U.S.C. 154(b) by 523 days.

(21) Appl. No.: 17/997,476

(22) PCT Filed: Apr. 29, 2021

(86) PCT No.: PCT/FR2021/050741
§ 371 (c)(1),
(2) Date: Oct. 28, 2022

(87) PCT Pub. No.: WO2021/219963
PCT Pub. Date: Nov. 4, 2021

(65) Prior Publication Data
US 2023/0174891 A1    Jun. 8, 2023

(30) Foreign Application Priority Data
Apr. 29, 2020   (FR) ........................ 2004245

(51) Int. Cl.
*C11B 9/02*    (2006.01)
(52) U.S. Cl.
CPC ....................... *C11B 9/02* (2013.01)

(58) Field of Classification Search
CPC ....... C11B 9/02; C11B 9/027; A61K 2800/84; A61K 8/0216; A61K 8/9789; A61K 8/9794; B01D 3/00; A61Q 13/00
See application file for complete search history.

(56) References Cited

U.S. PATENT DOCUMENTS

2021/0235731 A1    8/2021  Gillet

FOREIGN PATENT DOCUMENTS

| EP | 425391 B1 * | 6/1994 | ............ A23G 3/346 |
| FR | 3011848 A1 | 4/2015 | |
| FR | 3081684 A1 | 12/2019 | |
| WO | WO2019234341 A1 | 12/2019 | |
| WO | WO-2021219963 A1 * | 11/2021 | ........... A61K 8/0216 |

OTHER PUBLICATIONS

International Search Report dated Sep. 14, 2021 for International Application No. PCT/FR2021/050741.
Notification under Article 94(3) EPC for European Patent Application No. 21 732 401.1, dated Nov. 5, 2025.

* cited by examiner

*Primary Examiner* — Cephia D Toomer

(57) ABSTRACT

The invention relates to the field of natural scents and fragrances. More particularly, the invention relates to a process for extracting scents from a plant material and to the provision thereof in solid form. This process combines steps of extraction, gas dissolution, cryogenicization, or even freeze-drying. The scent thus captured in the form of a deep-frozen matrix or of dehydrated powder can be used as a natural perfuming ingredient, in particular in cosmetics. The invention relates very particularly to the obtaining of perfuming extracts derived from mute flowers.

8 Claims, 1 Drawing Sheet

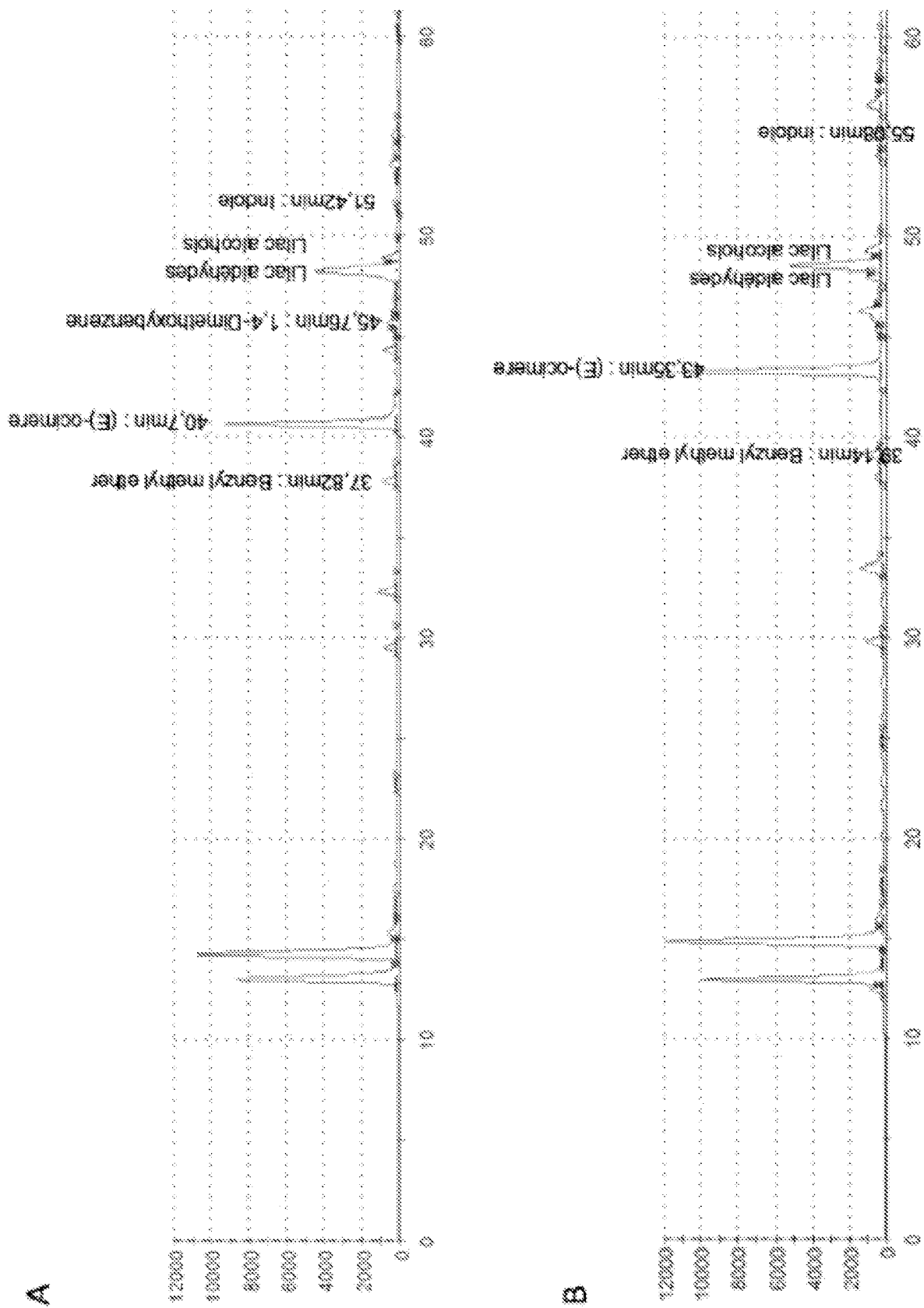

PROCESS FOR EXTRACTING SCENTS FROM PLANT MATERIAL IN SOLID FORM

CROSS-REFERENCE TO RELATED APPLICATION

This application is a national stage application, filed under 35 U.S.C. § 371, of International Patent Application No. PCT/FR2021/050741, filed on Apr. 29, 2021, which claims priority to French application No. FR2004245 filed Apr. 29, 2020, which is incorporated by reference herein in its entirety.

The invention relates to the field of natural scents and perfumes.

More particularly, the invention relates to a process for extracting scent from a plant material and making it available in solid form. This process combines steps of extraction, gas dissolution, cryogenics, or even freeze-drying. The scent thus captured in the form of a frozen matrix or of dehydrated powder can be used as a natural perfuming ingredient, in particular in cosmetics. The invention relates very particularly to the production of perfuming extracts from mute flowers.

TECHNICAL FIELD

All the flowers with the exception of rose, jasmin, tuberose, magnolia, narcissus, jonquil, mimosa, cassia, orange flower, lavender, genistae, ylang-ylang and osmanthus, are called "mute" flowers. A flower is said to be "mute" when it is not possible, by conventional extraction techniques of steam distillation or of volatile solvent extraction, or even enfleurage, to obtain an extract that can be used in perfumery since extraction yields are too low, or even zero. By way of example, if the tuberose may be in the form of an absolute, its cost is very high, of the order of 5000 € par kg, rendering it solely intended for exceptional perfumes.

Since the second half of the 19$^{th}$ century, chemists have proposed solutions in order to attempt to overcome this lack, by isolating and identifying compounds that would allow the recomposition of the expected scents by their combination, without never allowing faithful reproduction of the natural subtle scents released by the mute flowers.

Moreover, it may be noted that research to develop new extraction techniques or to improve existing techniques is very active. Patent databases reveal, for example, nearly 4000 applications filed in 2018 and 2019 alone.

These are essentially proposals for optimizing known processes, by selecting more suitable and tuberose more natural solvents or combinations of solvents for example, by optimizing the treatment parameters for given compound/feedstock pairs, or else by selecting in a more favorable manner the extraction of this or that compound. Few new extraction techniques have emerged in recent years, offering no alternative to the problem of mute flowers in particular.

On the other hand, natural fragrant extracts are usually extracted in liquid form. Preservation of these preparations is tricky since their constituting molecules are unstable, their smell evolving as a function of temperature, exposure to light, etc., which is associated with problems of preservation, storage and transport.

There is a real need of a more efficient and less expensive process for preparing natural fragrant ingredients from plant material in stabilized and industrially usable forms. In particular, there is no process for extracting mute flowers scents.

PRIOR ART

Patent Application FR3011848A1 describes a process for obtaining an oily plant extract from plant material comprising the steps of: a) mixing said raw material with at least one fatty substance; b) heating said mixture by microwave heating at a power of between 0.1 and 5 Watt per gram of mixture to a temperature between 25° C. and 60° C.; and c) recovering the fatty substance which is formed after mixing and heating the oily extract.

Patent application FR3081684A1 describes a process for obtaining a product in the form of frozen vaporisation granules, particles or beads rich in dissolved gas and associated equipment from a liquid, semi-liquid or pasty matrix comprising the steps consisting in gasifying the matrix by incorporation of a gas, dispense the matrix in the form of drops and cryogenize the matrix drops by immersion in a cryogenic fluid, characterized in that the step of gasification of the matrix consists in dissolving a large quantity of the gas generated by evaporation of the cryogenic fluid in the matrix drops by increasing the number of gas molecules in a high gas density zone, called high molecular density zone, the high molecular density zone being located above the surface of the cryogenic fluid and on the trajectory of the matrix drops before they are immersed in the fluid, said high molecular density zone being created by carrying out gasification and cryogenicization of the gasified drops within a closed enclosure configured to allow evacuation of the gas generated by the evaporation of the cryogenic fluid by natural convection.

DISCLOSURE OF THE INVENTION

The inventors have developed a process for extracting a smell from a plant material and storing it in solid form, either frozen or as a dehydrated powder.

In a remarkable manner, the process makes it possible to extract the scents from mute flowers. This extraction process comprises the following steps:
a) providing a plant material;
b) carrying out a treatment of said plant material, optionally under an inert atmosphere, in order to obtain a product in the form of a liquid, semi-liquid or pasty matrix;
c) dissolving a gas in said matrix by passage through a dense zone of gas molecules, such a density being obtained (i) either owing to the flow of gas generated by the evaporation of a cryogenic fluid, (ii) or by raising the pressure;
d) Cryogenicizing said gas-rich matrix obtained in step c) under pressure and temperature conditions that allow to maintain said gas in said matrix to obtain frozen granules, particles or beads.

The frozen granules, particles or beads may be freeze-dried so as to obtain a fragrant extract in the form of a dehydrated powder.

Advantages of the Invention

The present invention has numerous advantages compared to the state of the art.

The proposed extraction process is simple, quick and inexpensive. It uses two technologies known to a person skilled in the art, namely cryogenics and freeze-drying.

The first step is a step of cryogenic freezing or cryogenic deep freezing. In order to preserve the integrity of the plant matrix, the process firstly involves dissolving a gas in the matrix before cryogenicization, then carrying out the step of cryogenicization under pressure so as to keep, throughout the process, the gas trapped in the matrix and in particular in frozen granules, particles or beads. The presence of the gas, in particular in the case of an inert gas, protects the fragrant matrix during freezing and allows substantial improvements both in the properties of the products obtained and of the freeze drying step.

The second step is a lyophilization step.

Lyophilization is a process for dehydration by sublimation of water under temperature and pressure conditions allowing the water contained in solid form in the products to be directly converted into water vapor in order to be removed. Lyophilization makes it possible to obtain dehydrated products in powder form the fragrant properties off which are maintained.

The extraction process according to the invention has the advantage of being a fast process. Cryogenicization is a quasi-instantaneous process, allowing beads of product initially fluid to be produced continuously and at high rates (several hundreds of kg per hour on standard equipment). This allows huge time saving compared with freezer rooms, even operating at very low temperatures (–40° C. to –80° C. in general). The cryogenicized beads are extracted from the materials producing them at a temperature generally comprised between –80° C. and –120° C., which makes it possible to directly start freeze-drying, with products having temperatures close to 60° C., without a prior cooling step. More surprisingly, the lyophilization time itself is very greatly reduced (by a factor of at least 2).

With regard to the product obtained, the combination of gas dissolution with cryogenicization makes it possible to obtain frozen products containing a large amount of gas. When this gas is not oxygen gas, oxidation reactions are avoided. In addition, lyophilization of such products makes it possible to remove most of the water contained in the product. The quality of the dehydrated products is higher than that of the conventionally freeze-dried products because the conditions of the process are generally milder, less aggressive, and less destructuring with respect to the matrix. In particular, the fragrant properties of the matrix are therefore better preserved.

Surprisingly, it is possible to obtain powders with a good extraction yield starting from a plant material without addition of carrier agent. Such a powder 100% derived from plant material is of high quality. However, depending on the plant species, it may be necessary to add a carrier agent, either because the extraction leads to an oily product that cannot be shaped into powder form, or to fix particular fragrant molecules and thus increase the extraction yield. The addition of carrier agent is also useful for standardization of commercial powders.

The frozen granules, particles or beads as well as the freeze-dried powder obtained at the end of the process contain the fragrant molecules extracted from the biological matter and the fragrant ingredient is of high quality. The inventors have indeed observed that the scent of these solid ingredients faithfully reproduces the scent of the fresh plant material and that this scent persists for a very long time without alteration. In addition, these fragrant ingredients do not contain alcohol and therefore make it possible to formulate perfumes without alcohol. Fragrant ingredients therefore have significantly improved properties compared with extracts available hitherto.

In a remarkable manner, the process according to the invention makes it possible to extract the scents from mute flowers. This result is extremely advantageous and opens up new horizons in the perfumery world, which can now access complex perfumes of mute flowers thanks to natural high olfactory quality ingredients at acceptable costs.

These 100% natural fragrant ingredients will also be able to be integrated into natural perfumes hitherto deprived of the scents of mute flowers, since these scents were so far available only via combinations of synthetic molecules. It is a safe bet that these ingredients will revolve this growing sector.

From a user's point of view, in particular perfume manufacturers, the formulation of perfuming compositions from fragrant ingredients proposed in the form of dehydrated powder is also advantageous. It provides ease of use, dosing and storage and it has a long shelf life due to product stability. The use may in particular be facilitated by formulation of the powder in a compressed form (compact powder), proposed for example in the form of small rollers of a determined weight, or of granules.

Another advantage of the dehydrated powders according to the invention is that they dissolve quickly and do not leave any deposit, which makes it possible to introduce them easily into liquid perfume compositions.

Thus, the inventors have developed a new process for preparing extracts of natural plant matrices allowing a high quality olfactory rendering and which yields allow the industrial use of the ingredients obtained.

DETAILED DESCRIPTION OF THE INVENTION

A first subject of the invention relates to a process for preparing an fragrant ingredient in solid form from a plant material comprising the steps of:
a) providing a plant material;
b) performing a mechanical treatment of the raw material, optionally under an inert atmosphere, in order to obtain a product in the form of a liquid, semi-liquid or pasty matrix;
c) dissolving a gas in said matrix by passage through a dense zone of gas molecules, such a density being obtained (i) either by owing to the flow of gas generated by the evaporation of a cryogenic fluid, (ii) or by raising the pressure;
d) cryogenicizing said gas-rich matrix obtained in step c) under pressure and temperature conditions that allow to keep said trapped gas in order to obtain frozen granules, particles or beads.

In an advantageous embodiment, the process further comprising the steps of:
a) lyophilizing said granules, particles or beads;
b) obtaining said fragrant ingredient in the form of dehydrated powder.

The dissolved gas can be an inert gas such as nitrogen, argon, etc. or a non-inert gas such as carbon dioxide or nitrous oxide, or a mixture of gases. If aiming at protecting the matrix against oxidation, a particularly preferred cryogenic fluid is liquid nitrogen.

Within the meaning of the invention, the term "under pressure" means conditions which allow a gas to be dissolved and/or trapped in a matrix and/or held in said matrix during freezing. The pressurization may be obtained either by raising the pressure, or by putting the matrix in contact with a cryogenic fluid, evaporation of this gas creating a gas molecule density equivalent to pressurization so that the gas molecules dissolve in the matrix.

When the dense zone of gas molecules is obtained by a pressure increase, this pressure is greater than atmospheric pressure, and may in particular be greater than 0.5 bar, 1 bar, 2 bar, 5 bar, 10 bar, 50 bar, 100 bar, 200 bar, or even 250 bar or more. In a particular embodiment, it is between 2 and 100 bar. For clarity, it is specified that the pressures expressed in this document correspond to relative pressures, that is to say that atmospheric pressure is considered to be a pressure of 0 bar.

In a preferred embodiment, the dense zone of gas molecules is obtained at least in part thanks to a flow of gas generated by the evaporation of a cryogenic fluid. It can be obtained by associating the evaporation of a cryogenic fluid with a pressure increase. The wording "a flow of gas generated by the evaporation of a cryogenic fluid" encompasses the flow directly resulting from the evaporation of a cryogenic fluid as well as any controlled flow (direction, flow rate, etc.), by gas injection or suction for example, that may be used to create one or more exchange zones between the matrix and a very large number gas molecules.

The pressure and temperature conditions applied in step d) must allow the gas trapped in the matrix to be maintained in step c). A person skilled in the art will know how to adjust the pressure and temperature conditions during step d), such that the solubility of the gas in the matrix is greater than or equal to that implemented during step c). Said solubility is in particular influenced by the temperature (for gases it increases when the temperature decreases) and by the pressure (equilibrium of the partial pressures in the matrix and in the gas).

Thus, steps c) and d) take place under correlated conditions (between these two steps) in order to allow dissolution of the gas in the matrix and its preservation inside the matrix during cryogenicization.

Regarding the implementation of the process as a whole, it is possible to carry out the steps of the process one after the other and in particular to carry out the lyophilization step immediately after the cryogenics step. In addition, the process can be carried out continuously. It is also possible to keep the product in frozen form at the end of the cryogenicization step and to carry out freeze-drying subsequently, after a negative cold storage period in order to keep the products in the solid state (for example at −20° C.). In both cases, the advantage of the process is retained.

Thus, according to alternative embodiments, the lyophilization step may be carried out either immediately following the cryogenicization step, or subsequently after storage of said frozen granules, particles or beads.

The conditions of the process can be adapted according to the shape of the matrix to be dehydrated, in particular the pressure during the cryogenic stage, and the freeze-drying parameters. A person skilled in the art will know how to perform such adaptations.

Advantageously, the matrix obtained by treatment of the plant material is transferred rapidly into the gas dissolution and cryogenicization apparatus in order to limit deterioration or denaturation of the compounds.

Within the meaning of the invention, the term "plant material" means plants in the general sense of the expression by considering that any plant material has a smell, the intensity of which can vary. It may in particular be flowers or parts of flowers such as petals, pistilles, leaves, stems, but also herbaceous plants such as aromatic herbs, fruit of any type such as raspberries, lychees, apples, vanilla pods or roots such as ginger, or spices. The plant material is preferably fresh, or freshly cut, so that smelling molecules are not altered, and the smell emanating from the plant material is closest to the natural state.

In a preferred embodiment, the plant material consists of flowers and their different parts, in particular petals.

By "treatment" of the plant material is meant any transformation of the plant material into a liquid, semi-liquid or pasty matrix such as mechanical extraction (by virtue of a juice extractor), pressing, mixing, etc.

Within the meaning of the invention, the expression "mute flower" means a flower from which neither essence nor absolute can be extracted. The techniques known to the person skilled in the art of perfumery, such as volatile solvent extraction and steam distillation, do not make it possible to extract their fragrance. Mute flowers include, for example, lily flower, violet flower, hyacinth, buddleia, peony, freesia, lily of the valley, honeysuckle, *gardenia*, carnation, *pittosporum*, Mock Orange, sweet pea, glycine and heliotrope. Thus, in a preferred embodiment of the invention, the plant material comes from a mute flower.

In another preferred embodiment of the invention, the plant material consists exclusively of petals or exclusively of petals and flower pistils.

A second subject of the invention relates to a natural fragrant ingredient obtained according to the process described above in the form of frozen granules, particles or beads.

A third subject of the invention relates to a natural fragrant ingredient obtained according to the process described above in the form of a dehydrated powder.

This powder may be 100% derived from the fragrant plant material. Such a product, if technically feasible (sufficient yield, non-oily extracted product, etc.) will be highly concentrated, which may be an indication that the product is of high quality.

The powder may also contain, in addition to the plant material, a carrier agent which makes it possible to fix the fragrant molecules. Such a carrier agent may consist of maltodextrins or of a plant natural carrier agent in the case of an 100% vegetable ingredient.

In a preferred embodiment of the invention, the fragrant ingredient in frozen form or in dehydrated powder is obtained from a mute flower.

A fourth subject of the invention relates to a fragrant composition comprising at least one fragrant ingredient as defined previously.

In a preferred embodiment of the invention, such a composition comprises at least one fragrant ingredient obtained from a mute flower.

A fifth subject of the invention relates to a process for preparing a liquid fragrant composition comprising a step of dissolving at least one fragrant ingredient in the form of dehydrated powder as defined previously.

Fragrant ingredients and compositions containing them can be used in perfumery, i.e. in body perfumes and ambient perfumes, but also in cosmetics.

The present invention is illustrated by means of the following examples, which should in no be considered as limiting the scope of the present invention.

DESCRIPTION OF THE FIGURES

FIG. 1: Chromatograms obtained by analysis with an AlphaMos Heracels II electronic nose (double ultrafast gas chromatography) of lilac powders prepared by applying the extraction process according to the invention (A: column 1; B: column 2).

EXAMPLES

Example 1: Preparation of Lilac Powders

Preparation Process

White lilac flowers and mauve lilac flowers were harvested and processed separately.

The petals were manually separated from the flowers before passing through an ANGEL 7500 horizontal juice extractor. The juice thus collected was immediately treated in an equipment making it possible to cryogenize it while trapping dissolved gas therein, for example according to the process described in patent WO2019/234341. The frozen beads thus obtained were then freeze-dried according to standard conditions in a CHRIST alpha 1-8 freeze-dryer until "dry" powders (no more loss of measured weight) were obtained.

Powders Features

The first remarkable feature comes from the quantity of powder thus obtained. For the two flowers treated, the powder yields were of about 5%, which is very high since no carrier agent was added and that it therefore corresponds only to matter that was initially present in the petals. Lyophilization additives are generally added to the preparations to be freeze-dried, in order to guarantee the presence of a dry extract sufficient to bind molecules of interest during the treatment and also to reduce the production costs. The yield obtained during this preparation is already very convincing regarding these two points without the need for any additive.

The second very remarkable feature is the smells of the products thus obtained, which have been very clearly identified as being those of the two respective flowers by the different panels tested. Electron nose analyses (FIGS. 1A and 1B) have also made it possible to confirm the presence, in the product, of characteristic peaks associated with chemical compounds known to be significantly contributing to lilac flowers fragrances:

- (E)-ocimere, which is the major component;
- lilac aldehydes and lilac alcohols, which each have several dimers and are part of the most characteristic compounds;
- benzyl methyl ether, 1,4-dimethoxybenzene and indole, which are the other compounds that are characteristic of the lilac fragrance.

The peaks were identified on the chromatograms using their retention indices on each column. The reference data are those of the software associated with the measurement apparatus Heracles II and of the WebBook of the NIST, available in particular from the address: https://webbook.nist.gOv/chemistry/#Search.

Lilac being one of the so-called "mute" flower, it is all the more remarkable to have succeeded in obtaining, in a relatively large amount, a product which meets the requirement in terms of smell for its use as ingredient for perfumery or cosmetic products.

Example 2: Preparation of Jasmine Powders

Jasmine flowers were collected.

The petals and pistils were manually separated before passing through an ANGEL 7500 horizontal juice extractor. Part of the juices thus collected were immediately treated in an equipment making it possible to cryogenize them while trapping dissolved gas therein, for example according to the method described in patent WO 2019/234341. The frozen beads thus obtained were then freeze-dried according to standard conditions in a CHRIST alpha 1-8 freeze-dryer until "dry" powders (no more loss of measured weight) were obtained. In the other juice fractions, each of which representing 200 g, 50 g of maltodextrins were added each time, and the mixtures thus obtained were then subjected to the same process as described previously, until powders were obtained. The powder yields of powder thus obtained are:

- approx. 5% for petals without adding maltodextrins;
- approx. 10% for the pistils without adding maltodextrins;
- approx. 30% for petals with addition of maltodextrins;
- approx. 35% for the pistils with addition of maltodextrins;

All the products obtained have a scent which is much similar to that of the starting flower.

The choice of adding or not adding a carrier agent such as maltodextrins depends on the starting matrix and on the desired quality of product. For certain products, the dry powder alone can revert to a liquid state, this is the case in particular when the oily fraction is too large; in this case, it is necessary to add a carrier agent at the step of lyophilization. On the other hand, by adding a carrier agent, the yield is increased as illustrated above, which is economically advantageous, and allows standardization of the products.

The invention claimed is:

1. A process for preparing a fragrant ingredient in solid form from a plant material wherein the process comprises:
   a) providing a plant material obtained from a mute flower;
   b) transforming said plant material into a liquid, a semi-liquid or a pasty matrix;
   c) dissolving a gas in said matrix by passage through a dense zone of gas molecules, such a density being obtained (i) either owing to a flow of the gas generated by the evaporation of a cryogenic fluid, (ii) or by an increase in pressure; and
   d) Cryogenicizing said gas-rich matrix obtained in c) under pressure and temperature conditions allowing to keep said gas trapped in order to obtain frozen granules, particles or beads.

2. The process of claim 1 further comprising the steps of:
   a) lyophilizing said granules, particles or beads; and
   b) obtaining said fragrant ingredient as a dehydrated powder.

3. The process of claim 1, wherein said mute flower is selected from lily flower, violet flower, hyacinth, buddleia, peony, freesia, lily of the valley, honeysuckle, gardenia, carnation, pittosporum, Mock Orange, sweet pea, glycine and heliotrope.

4. The process according to claim 1, in which said plant material consists exclusively of petals.

5. A natural fragrant ingredient obtained according to the process of claim 1 in a form selected from the group consisting of frozen granules, particles, beads and dehydrated powder.

6. A fragrant composition comprising at least one fragrant ingredient obtained from a mute flower prepared according to the process of claim 1.

7. A process for preparing a liquid fragrant composition comprising dissolving at least one fragrant ingredient prepared according to the process of claim 1 in a liquid perfume composition.

8. The process of claim 1 wherein the transformation of said plant material at b) is performed under an inert atmosphere.

* * * * *